(12) United States Patent
Derr (10) Patent No.: US 6,267,018 B1
(45) Date of Patent: Jul. 31, 2001

(54) MEASURING DEVICE

(75) Inventor: Andreas Derr, Wutoeschingen-Degernau (DE)

(73) Assignee: Testo GmbH & Co., Lenzkirch (DE)

( * ) Notice: Subject to any disclaimer, the term of this patent is extended or adjusted under 35 U.S.C. 154(b) by 0 days.

(21) Appl. No.: 09/268,380

(22) Filed: Mar. 15, 1999

(30) Foreign Application Priority Data

Mar. 19, 1998 (DE) ............................................ 198 12 027

(51) Int. Cl.⁷ ....................................................... G01F 1/68
(52) U.S. Cl. ........................................................... 73/866.3
(58) Field of Search ................................ 73/23.31, 23.32, 73/105, 204.11, 198, 201, 756, 117.2, 117.3, 866.3; 374/208

(56) References Cited

U.S. PATENT DOCUMENTS

| | | | |
|---|---|---|---|
| 3,593,023 | * | 7/1971 | Dodson ................................. 73/23.31 |
| 4,355,911 | * | 10/1982 | Tymkewicz . | |
| 4,435,978 | * | 3/1984 | Glatz ....................................... 73/198 |
| 4,522,270 | | 6/1985 | Kishi ..................................... 173/163 |
| 4,580,909 | * | 4/1986 | McIntosh . | |
| 4,643,022 | * | 2/1987 | Werlberger et al. ................ 73/117.3 |
| 4,776,212 | * | 10/1988 | Parsons et al. . | |

FOREIGN PATENT DOCUMENTS

| | | |
|---|---|---|
| 2062010 | 12/1970 | (DE) . |
| 3020095 | 12/1981 | (DE) . |
| 3513345A1 | 4/1985 | (DE) . |
| 4426501A1 | 7/1994 | (DE) . |
| 19638388A1 | 9/1996 | (DE) . |
| 0206215B1 | 6/1986 | (EP) . |
| 8102690 | 1/1983 | (NL) . |

\* cited by examiner

*Primary Examiner*—Robert Raevis
(74) *Attorney, Agent, or Firm*—Foley, Hoag & Eliot LLP (57) ABSTRACT

A measuring device is disclosed that includes a shaft, a display and/or control unit pivotally supported on an upper end of the shaft, and at least one sensor element disposed in the shaft and operatively connected with the display/control unit. The shaft has at least one foldable shaft section. The device can be operated with one hand and allows flow measurements in channels of varying depth.

18 Claims, 7 Drawing Sheets

MEASURING DEVICE

BACKGROUND OF THE INVENTION

1. Field of the Invention

This application relates to the field of measuring flow in channels and more particularly to a flow measuring device with an integrated display.

2. Description of Related Art

Measuring devices of this type are known and are used, for example, for measuring temperature. A temperature sensor is disposed in a measuring tip that extends in a direction away from a display and control unit. To facilitate read-out of the measured temperature, the display that is located in the display and/or control unit is typically pivotally supported with respect to the measuring tip. Unlike conventional measuring devices having a sensor that is connected to a display and/or control unit with a cable, measuring devices of the aforementioned type can be operated with one hand.

Such one-piece measuring devices, however, have thus far not been used for flow measurements, because flow in channels of varying depth can only be measured using devices with a long shaft. Devices with a long shaft, however, are difficult to transport and can be easily damaged.

It would therefore be useful to provide a measuring device that can be operated with one hand and that allows flow measurements in deeper channels. Such device should also be easy to transport and to operate, and thereby mitigate some of the disadvantages of conventional flow measuring devices.

SUMMARY OF THE INVENTION

In general, according to one aspect of the invention, the measuring device includes at least one foldable shaft section, so that the shaft can be folded into a convenient size after the measurements are concluded, and the measuring device can be transported easily and without the danger of breaking the shaft.

Advantageous embodiments of the invention may include one or more of the following features.

A battery compartment may be integrated with the shaft. With this feature, several batteries may then be arranged end-to-end inside the shaft to provide a high enough voltage and a large charge storage capacity for operating the display and/or control unit and the sensor element. The shaft diameter need only be slightly larger than the diameter of a 1.5 volt battery. Since the battery compartment is housed inside the display and/or control unit, environmentally safe rechargeable batteries can be used to supply the power. This feature is not found in other conventional measuring devices that can be operated with one hand. In order to keep the display and/or control unit small, conventional measuring devices can only use non-rechargeable batteries to conserve space.

The battery compartment may have a feed opening which is accessible from the front when viewed in the direction of the shaft. The batteries are successively inserted into the battery compartment through the feed opening; the size of the feed opening need only be slightly larger than the cross-section of the batteries. Because the feed opening is small, it can be easily sealed.

The battery compartment may be formed as a hollow space in the shaft. Another shaft section arranged subsequent to the battery compartment is releasably connected to the shaft section which houses the battery compartment. This feature allows the feed opening of the battery compartment to be easily opened and closed. The shaft section that houses the battery compartment, and the subsequent shaft section may be unfolded with a hinge to provide access to the feed opening. In the folded state, the two shaft sections are locked in place relative to each other by a safety sleeve forming a bayonet-type locking mechanism.

The display and/or control unit may be rotatably supported on the shaft by an articulated first joint, wherein the articulated first joint has a locking mechanism which limits the orientation of the display and/or control unit with respect to the shaft to one or more pre-determined angular positions. The locking mechanism reliably prevents the display and/or control unit from being inadvertently moved with respect to the shaft.

In a measuring device for flow measurements, the sensor element may be implemented as a hot-wire element and arranged in the region of the lower shaft in a flow channel extending perpendicular to the shaft axis. Alternatively, or in addition, a thermocouple for measuring temperature may be arranged in the flow channel or at the lower tip of the shaft.

The shaft section having the flow channel may be supported for rotation about the shaft axis. With this feature, the flow channel may be oriented in the flow direction of the medium to be measured without having to change the position of the display and/or control unit.

A second articulated joint may be provided for folding and unfolding the at least one shaft section. The second joint has a first hinge and a second hinge, wherein each hinge can be folded by, at most, 90° and the hinges have a common hinge web extending along an axial shaft direction. Both hinges may have a locking mechanism which allows the hinges to lock in at least an angular position of 0° and 90°, respectively. With this feature, the foldable shaft section cannot be inadvertently folded or unfolded when in the unfolded and the folded state, respectively.

A wire connection between the sensor element and the display and/or control unit and the battery compartment, respectively, may be routed through the pivot axes of the two hinges. With this feature, the wire connection is not strained when the two hinges are rotated to fold the shaft. This feature also eliminates complex arrangements for compensating for the changing length of the wire connection.

In addition, a protective sleeve which can rotate about the shaft axis, may be arranged in the region of the sensor element. The protective sleeve has diametrically opposed openings to accommodate the flow channel. The protective sleeve, which is non-detachably connected to the shaft, can be rotated into a first position in order to open the flow channel for a measurement, and into a second position to close the flow channel. In this way, the sensor element is protected from damage or contamination, for example, during transport.

Further features and advantages of the present invention will be apparent from the following description of preferred embodiments and from the claims.

DETAILED DESCRIPTION OF PREFERRED EMBODIMENTS

Unless otherwise noted, identical reference numerals in the figures denote identical parts or parts having an identical function.

Figure 1:
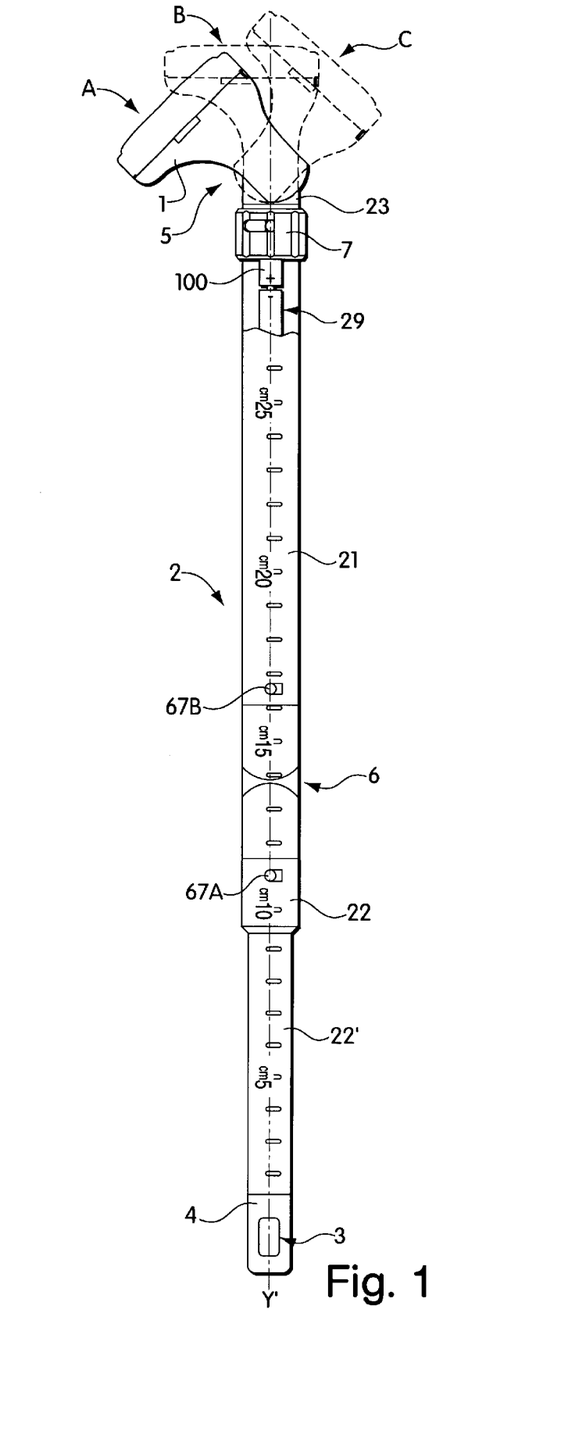
FIG. 1. is a measuring device according to the invention with a portable shaft in an operating position.

Referring first to FIG. 1, a measuring device according to the invention includes a display and/or control unit 1 which is supported for rotation with respect to a shaft 2 by an articulated joint 5, which is not shown in detail in FIG. 1. FIG. 1 illustrates three exemplary different pivot positions A, B, C of the display and/or control unit; the pivot positions B, C of the display and/or control unit are shown as dotted lines.

Figure 9A:
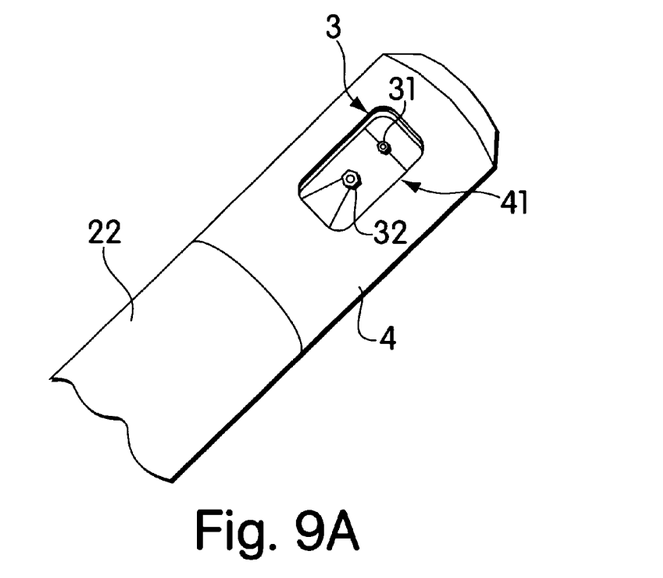
FIG. 9. shows in detail the shaft section with the sensor element.
Figure 9B:
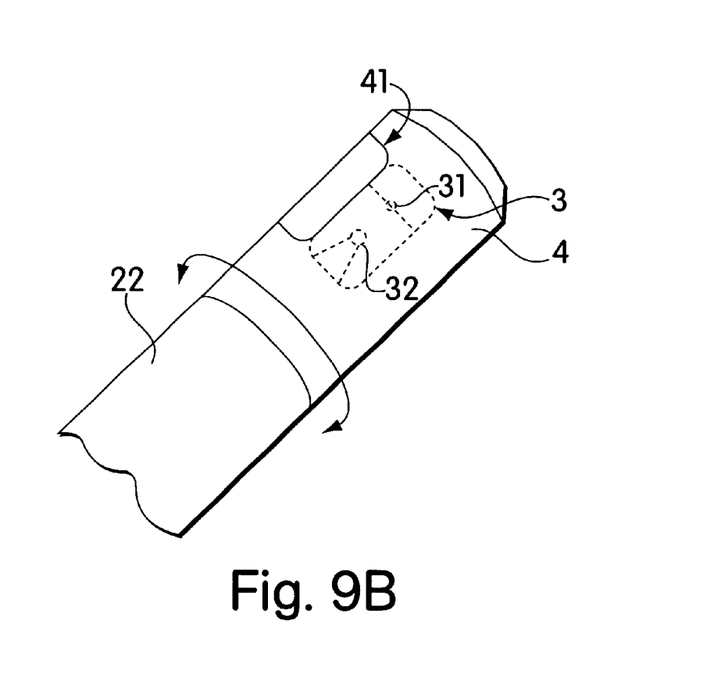

The shaft 2 has an upper shaft section 21 and a lower shaft section 22 which can be unfolded with respect to the upper shaft section via an articulated joint 6. The lower shaft section 22 of the exemplary measuring device for measuring flow includes a flow channel 3. As shown in detail in FIG. 9, the flow channel 3 includes a hot-wire element 31 for measuring the flow and a thermocouple 32 for measuring temperature. A protective sleeve 4, which can be rotated about the shaft axis Y–Y', is arranged in the region of the flow channel 3. The protective sleeve 4 has opposing openings 41 which, depending on their respective position, can either open the flow channel 3 or, as illustrated in FIG. 9B, close the flow channel 3, so that the sensor elements 31, 32 are protected from damage, for example, during transport.

A shaft section 22' which is part of the lower shaft section 22 and includes the flow channel 3 and the sensor elements 31, 32, respectively, is supported for rotation about the shaft axis Y–Y' with respect to the upper shaft section 21. In this way, the flow channel 3 can be oriented with respect to the flow of the medium to be measured while retaining the set position of the display and/or control unit 1. As mentioned above, the display and/or control unit 1 can only be tilted with respect to the upper shaft section 21 about a pivot axis that is perpendicular to the shaft axis Y–Y'; the display and/or control unit 1, however, cannot be rotated about the shaft axis Y–Y'.

Figure 2:
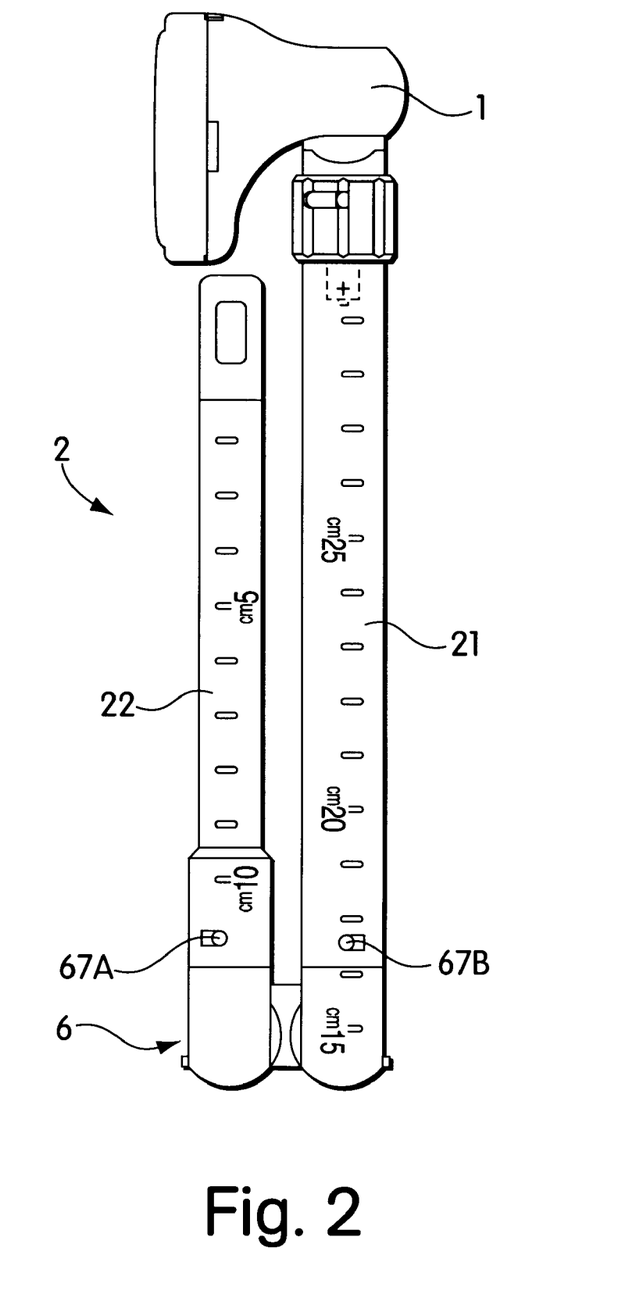
FIG. 2. is a measuring device according to the invention wherein the shaft is unfolded.

The illustrated measuring device according to the invention can be operated with one hand and is adapted for flow measurements in channels having different depths. A graduated depth scale is provided on the circumference of the shaft 2 so that the measuring depth can be read out. After the measurement is has been completed, the shaft 2 can be folded as illustrated in FIG. 2, so that the measuring device can be easily and safely transported. When the display and/or control unit 1 is rotated into the completely folded position indicated in FIG. 2, the transport height of the measuring device is also reduced.

Figure 8:
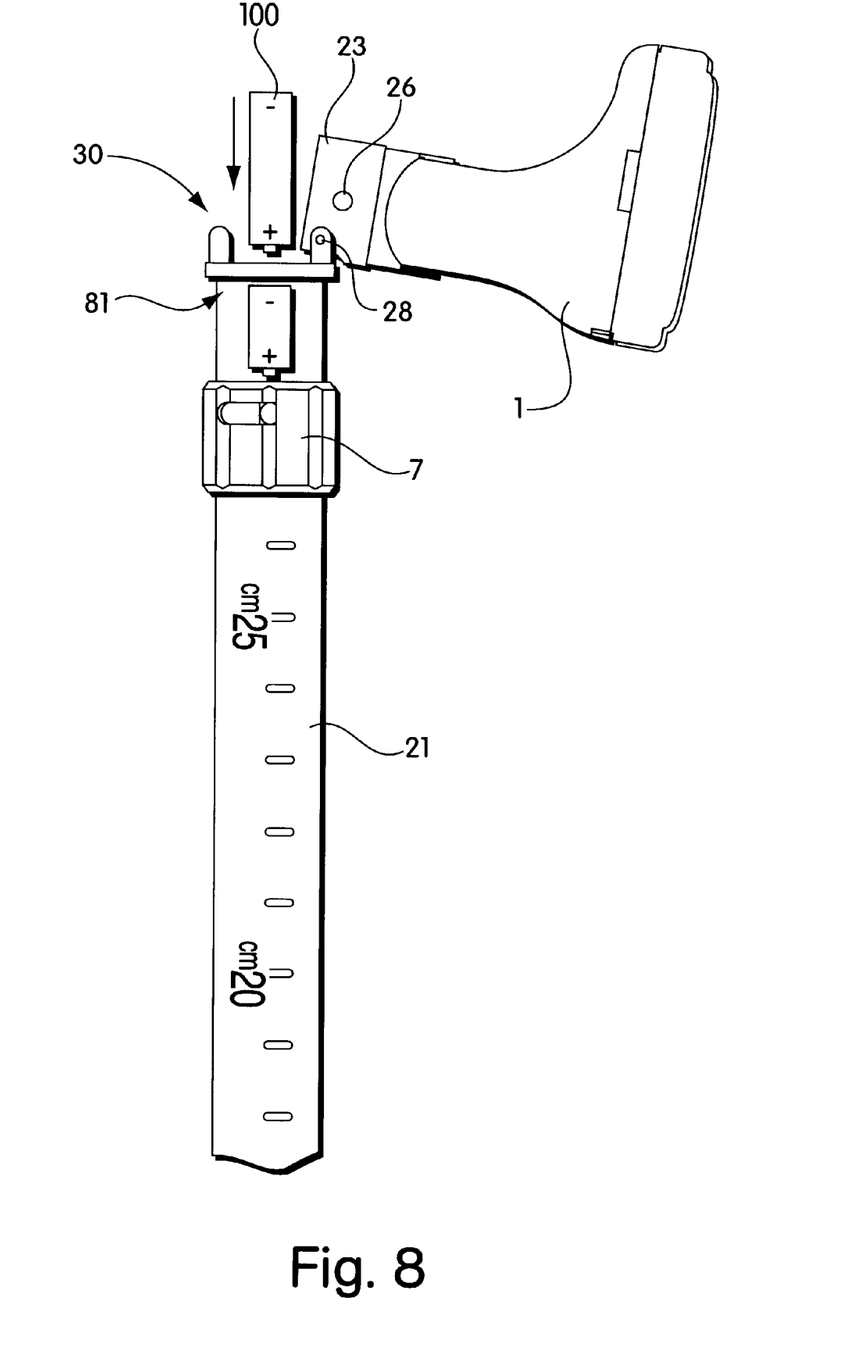
FIG. 8. shows the measuring device according to the invention with the battery compartment open.

A battery compartment 29, which is formed as a hollow space in the upper shaft section 21, can house several batteries 100. The batteries 100 can be arranged in the battery compartment 29 end-to-end. The battery compartment 29 has an feed opening 30 which is accessible from the front as viewed in the direction of the shaft and facilitates insertion of the batteries 100 into the battery compartment 29. For opening the feed opening 30, a section 23 of the upper shaft section 21 which is arranged subsequent to the battery compartment 29, is releasably connected to the shaft section that houses the battery compartment. The releasable connection has the form of a bayonet locking mechanism and includes a safety sleeve 7 which, when closed, abuts an annular shoulder 81 of the shaft section that houses the battery compartment. The annular shoulder 81 secures via a radially extending groove 71 a projection 26 of the subsequent shaft section 23 to connect the shaft section that houses the battery compartment 29 and the subsequent shaft section 23 with each other. When the safety sleeve 7 is released, as illustrated in FIG. 8, the subsequent shaft section 23 is secured to the shaft 2 through a hinge 28.

Figure 5:
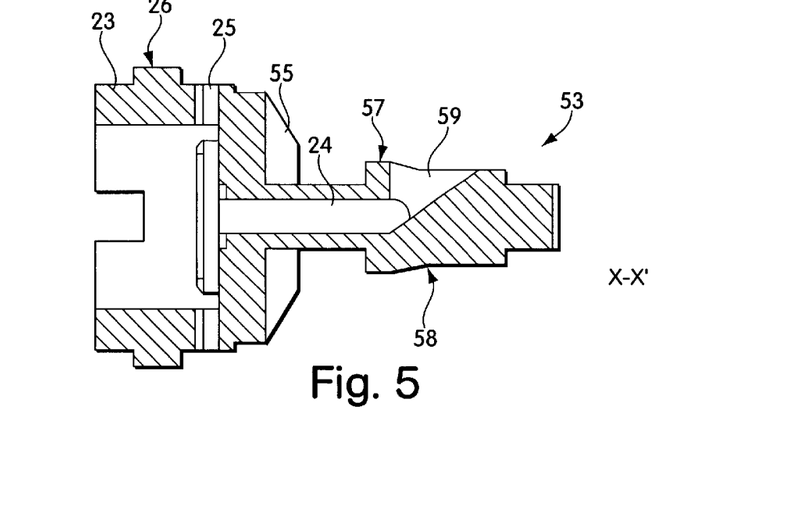
FIG. 5. is a cross section of the articulated head according to FIG. 4.

FIGS. 3 through 6 illustrate the design and the operation of the first articulated joint 5 which allows the display and/or control unit 1 to rotate with respect to the shaft 2. FIG. 5 is a cross section along a plane X–X' oriented perpendicular to the drawing surface of FIG. 3. The articulated joint 5 has an articulated head 53 which forms a part of the shaft section 23 that closes off the battery compartment 29. The articulated head 53 is formed as a flat piece with a circumferential section in the form of a semicircle and includes locking grooves 54. A pivot shaft 58 extends on both sides of the major surface of the flat piece, wherein the pivot shaft 58 is substantially cylindrical with two parallel flats 58' disposed on the outer surface of the pivot shaft 58. A circular opening 59 for receiving wires is located on a front side of the pivot shaft 58 and terminates in a wiring channel 24 located inside the articulated head 53.

Figure 3:
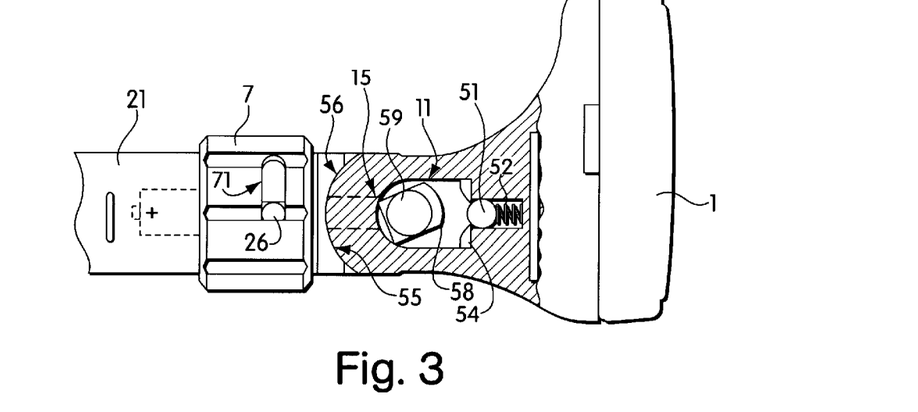
FIG. 3. shows in detail the articulated mechanism for rotating the display and/or control unit with respect to the shaft.
Figure 4:
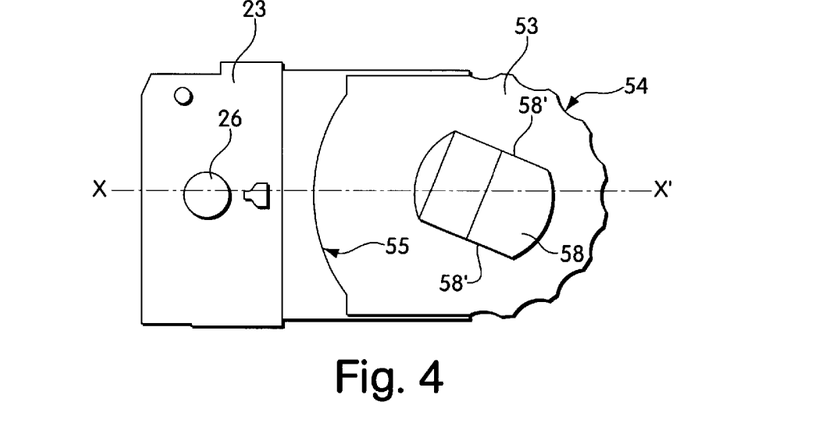
FIG. 4. shows in detail the articulated head arranged on the shaft.

FIG. 3 is a partial sectional view of the display and/or control unit 1 to illustrate more clearly the position and the operation of the articulated head 53 when the articulated joint is folded. The display and/or control unit 1 includes a recess 11, with the pivot shaft 58 contacting the lateral faces of the recess 11. A spring 52 and a ball 51 are arranged in a cylindrical recess extending away from the recess 11, within the sphere 51 is biased by the spring 52 in the direction of the circumferential section of the articulated head 53 that has the locking grooves 54. The dimensions of the locking grooves 54 match the dimensions of the sphere 51. In this way, the sphere 51 lockingly engages with successively arranged locking grooves 54 when the display and/or control unit is tilted, whereby the tilt position of the display and/or control unit 1 are preset. In the assembled state, a concave pressure surface 55 of the articulated head 53 and a convex pressure surface 56 of the display and/or control unit contact one another.

Figure 6:
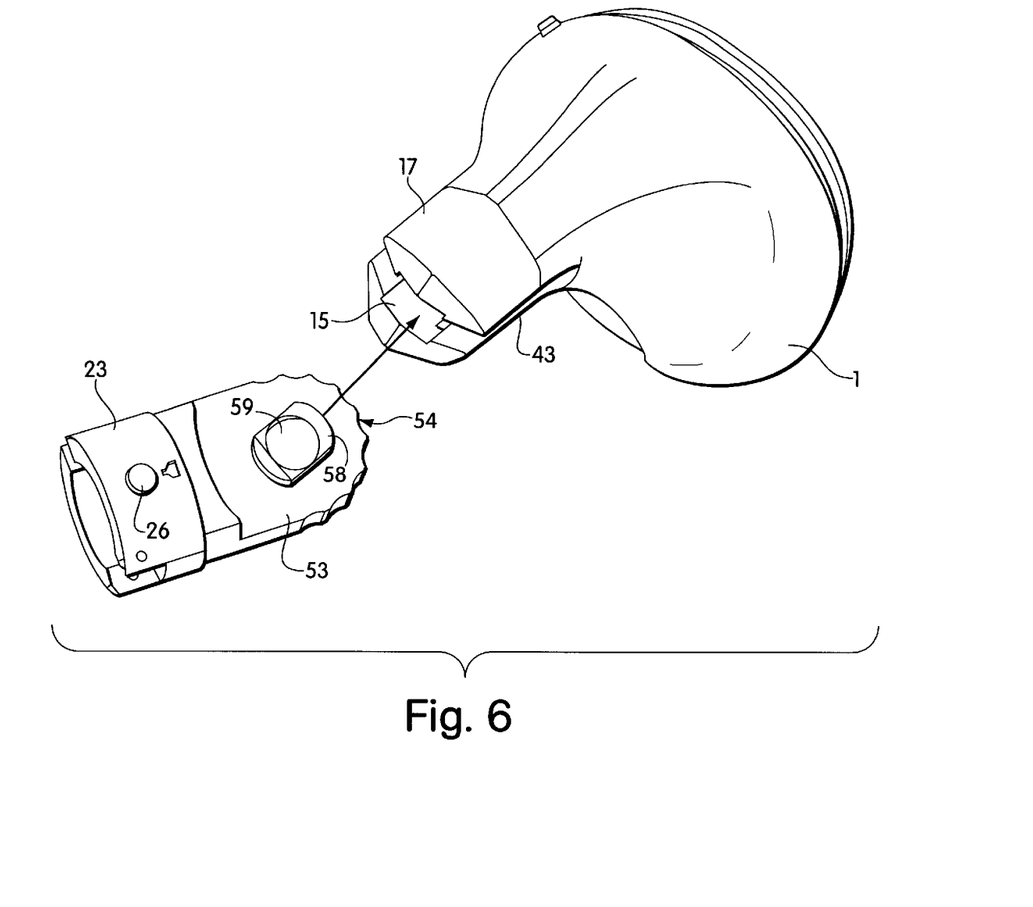
FIG. 6. is a perspective view of the display and/or control unit and the articulated head before assembly.

FIG. 6 illustrates the assembly of the shaft with the articulated head 53 and the display and/or control unit 1. The display and/or control unit 1 includes a shaft section 17 with an insertion channel 15. The dimensions of the insertion channel 15 match those of the pivot shaft 58'; the width of the channel corresponds to the spacing between the flat sections 58' of the pivot shaft 58. The pivot shaft 58 can be inserted via the channel 15 into the recess 11 of the display and/or control unit 1, as illustrated in FIG. 3. The pivot shaft 58 then locks with the recess 11 through a locking shoulder 57. As a result, the pivot shaft 58 cannot be pulled out when the display and/or control unit 1 is exactly in the tilt position described above. The articulated head 53 is also prevented from being pulled out of the shaft section 17 in the other tilt positions, because the pivot shaft 58 then engages with the recess 11 behind the insertion channel 15, as illustrated more particularly in FIG. 3.

Figure 7:
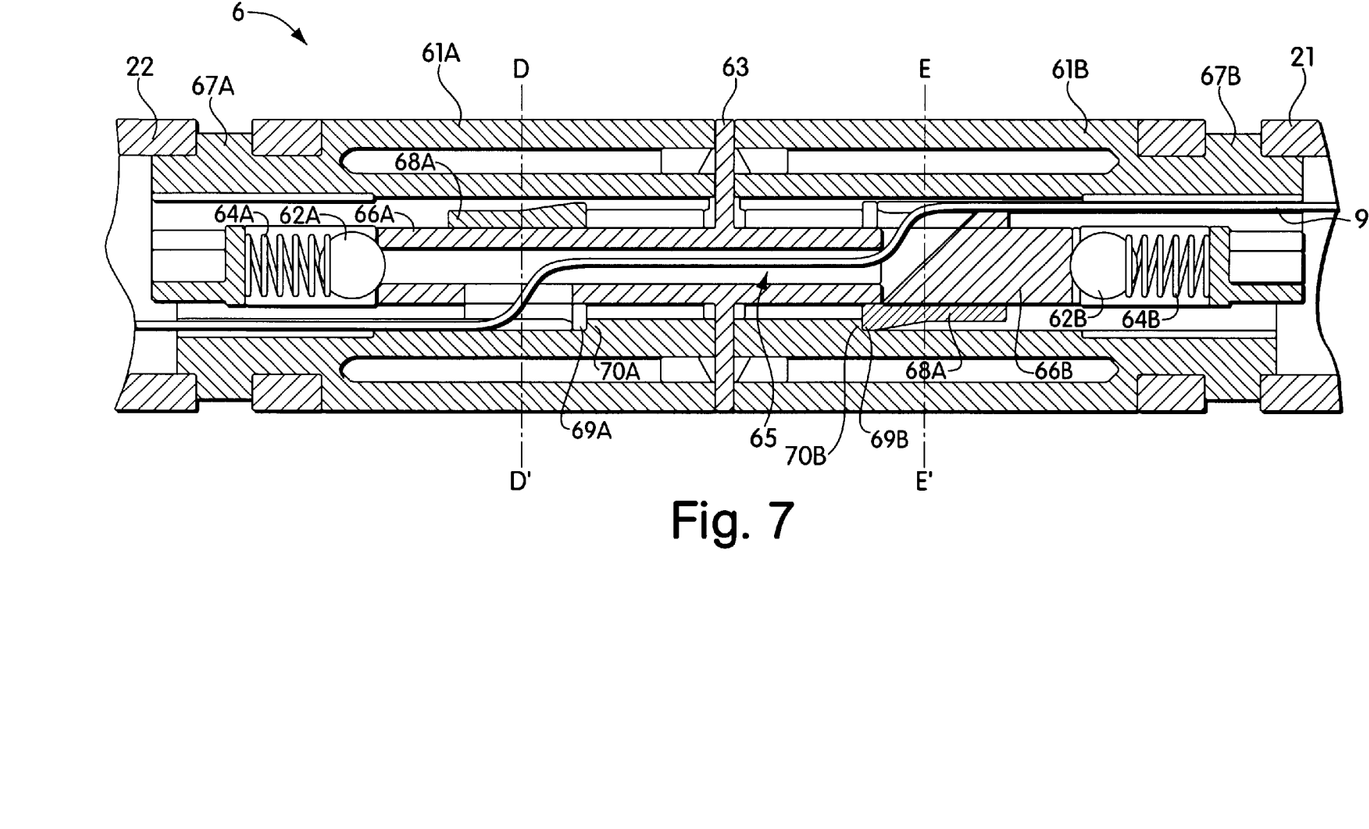
FIG. 7. is a cross section of the articulated mechanism for unfolding the shaft.

FIG. 7 shows a cross section of the second articulated joint 6 which is provided for unfolding the shaft 2. The articulated joint 6 is essentially constructed of two hinges which operate similar to the articulated joint 5 that is illustrated in FIGS. 3 to 6 and allows the display and/or control unit 1 to tilt. For the sake of clarity, corresponding elements of the two hinges are designated with the same reference numerals and distinguished by the suffixes A and B. Each of the two hinges includes a respective hinge fork 61A, 61B, which is rigidly connected to the upper and lower shaft sections 21, 22. The shaft sections 21, 22 and the hinge forks 61A, 61B are connected with a type of bayonet mechanism. The shaft sections 21, 22 have recesses extending in the radial direction and adapted to engage projections 67A, 67B disposed on the hinge forks 61A, 61B.

The hinge forks 61A, 61B are connected to each other by a common hinge web 63 which supports tension. The hinge web 63 has opposing articulated heads 66A, 66B, and each articulated heads 66A, 66B includes-a hinge pin 68A, 68B. A locking shoulder 69A, 69B of the hinge pin 68A, 68B is adapted to engage with a respective locking recesses 70A, 70B of the hinge forks 61A, 61B so as to prevent the articulated heads 66A, 66B from being pulled out of the recesses of the hinge forks 61A, 61B. Springs 64A, 64B and balls 62A, 62B are arranged in cylindrical recesses of the hinge forks 61A, 61B, whereby the balls 62A, 62B are biased in the direction of the articulated heads 66A, 66B so as to engage with respective locking recesses.

Each of the articulated heads 66A, 66B has at least two locking recesses, so that each of the hinges can lock in at least an angular position of 0° and an angular position of 90°. The hinge axes of the two hinges are illustrated in FIG. 7 by the dotted lines D–D' and E–E'. A wire connection 9 which provides an electrical connection between the sensor elements 31, 32 and the batteries 100 and the display and/or control unit 1, respectively, extends through the hinge axes, as illustrated in FIG. 7. With this feature, complex measures to compensate for the changing length of the wire connection 9 can be eliminated. A small length compensation of the wire connection 9 that may still be required when the shaft 2 is unfolded, can be easily implemented by using the illustrated double-S routing of the wire connection 9 through the hinge.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. Measuring device comprising:
   a shaft;
   a display/control unit pivotally supported on an upper end of the shaft; and
   at least one sensor element disposed in the shaft and operatively connected with the display/control unit,
   wherein the shaft comprises at least one foldable shaft section.

2. The measuring device according to claim 1, further comprising a battery compartment housed in a first region of the shaft.

3. The measuring device according to claim 2, wherein the battery compartment further comprises a feed opening which is accessible from a front end of the shaft.

4. The measuring device according to claim 3, the shaft further comprising:
   a second shaft region adjacent to the battery compartment connected to the first shaft region by a releasable connection,
   wherein the feed opening is accessible when the releasable connection is released.

5. The measuring device according to claim 4, wherein the releasable connection is formed as a bayonet mechanism.

6. The measuring device according to claim 1, further comprising;
   a first articulated joint that pivotally supports the display/control unit and includes a locking mechanism,
   wherein the locking mechanism provides a plurality of pre-determined angular positions of the display/control unit with respect to the shaft.

7. The measuring device according to claim 1, wherein a flow channel that is oriented perpendicular to a longitudinal axis of the shaft, in formed in a lower end of the foldable shaft section, and wherein the sensor element is a hot-wire element disposed in the flow channel.

8. The measuring device according to claim 7, wherein the foldable shaft section that has the flow channel is supported for rotation about a longitudinal axis of the shaft.

9. The measuring device according to claim 1, wherein the sensor element is a thermocouple.

10. The measuring device according to claim 6, wherein the shaft comprises a second articulated joint for folding the foldable shaft section, the second articulated joint further comprising a first hinge and a second hinge having mutually parallel pivot axes, wherein the first hinge and second hinge have a common web extending in a direction parallel to the pivot axes.

11. The measuring device according to claim 10, wherein each of the hinges can be rotated by at most 90°.

12. The measuring device according to claim 10, wherein each of the hinges has a respective locking mechanism for locking the hinge in an angular position of one of 0 and 90°.

13. The measuring device according to claim 10, further comprising a wired connection for operatively connecting the sensor element with the display/control unit, wherein the wired connection extends through the respective pivot axes of the first and second hinge.

14. The measuring device according to claim 1, wherein the shaft further comprises a protective sleeve disposed proximate to the at least one sensor element, and wherein the protective sleeve can rotate about a longitudinal shaft axis and has diametrically opposing openings for a flow channel.

15. Measuring device comprising:
   a shaft having at least two shaft sections;
   an articulated joint connecting the two shaft sections, wherein a first shaft section can be folded with respect to a second shaft section;
   at least one sensor disposed on the first shaft section for measuring a physical quantity; and
   a display/control unit disposed on the second shaft section and operatively connected to the at least one sensor for at least one of controlling the sensor and displaying the physical quantity measured by the sensor,
wherein the physical quantity is at least one of temperature and flow.

16. Measuring device comprising:
   a shaft having at least two shaft sections;
   an articulated joint connecting the two shaft sections, wherein a first shaft section can be folded with respect to a second shaft section;

at least one sensor disposed on the first shaft section for measuring a physical quantity; and a display/control unit disposed on the second shaft section and operatively connected to the at least one sensor for at least one of controlling the sensor and displaying the physical quantity measured by the sensor, wherein the second shaft section distal from the first shaft section comprises a battery compartment.

17. Measuring device comprising:

a shaft having at least two shaft sections;

an articulated joint connecting the two shaft sections, wherein a first shaft section can be folded with respect to a second shaft section;

at least one sensor disposed on the first shaft section for measuring a physical quantity; and a display/control unit disposed on the second shaft section and operatively connected to the at least one sensor for at least one of controlling the sensor and displaying the physical quantity measured by the sensor, wherein a flow channel is formed in the first shaft section and the sensor is disposed in the flow channel.

18. The measuring device of claim 17, wherein the flow channel has a flow axis that is oriented substantially perpendicular to a longitudinal axis of the first shaft section and wherein a protective sleeve with openings is provided that can be rotated about the longitudinal axis with respect to an orientation of the display/control unit disposed on the second shaft section.

\* \* \* \* \*